United States Patent Office

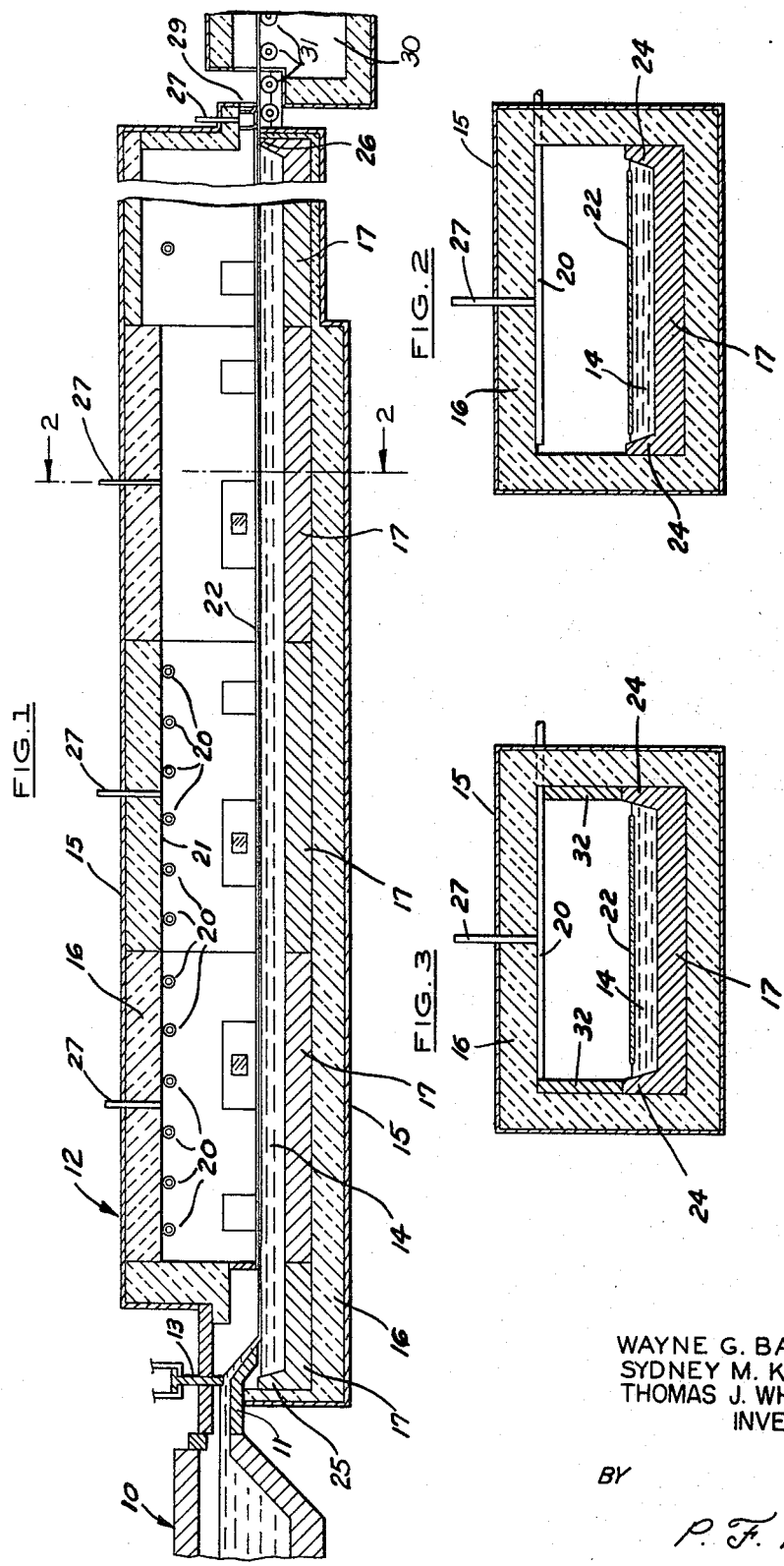
July 25, 1967 — W. G. BASLER ET AL — 3,332,763
PROCESS FOR MANUFACTURE OF GLASS
Filed Oct. 16, 1964
WAYNE G. BASLER
SYDNEY M. KAUFMAN
THOMAS J. WHALEN
INVENTORS
BY
P. F. Hilden
ATTORNEY

3,332,763
Patented July 25, 1967

1

3,332,763
PROCESS FOR MANUFACTURE OF GLASS
Wayne G. Basler, Lincoln Park, Sydney M. Kaufman, Livonia, and Thomas J. Whalen, Detroit, Mich., assignors to Ford Motor Company, Dearborn, Mich., a corporation of Delaware
Filed Oct. 16, 1964, Ser. No. 404,247
3 Claims. (Cl. 65—32)

This invention relates to the manufacture of flat glass by the "float process."

In the manufacture of glass by the float process, a continuous ribbon of molten glass is formed on the surface of a bath of molten metal, usually tin, the glass being soft enough to flow or fire-polish so as to even out surface irregularities. The bath is enclosed within a chamber in which a controlled protective atmosphere is maintained above the bath. The ribbon is advanced along the surface of the tin and the temperature of the tin is progressively decreased to permit the ribbon to harden sufficiently so that, at the end of the bath, the ribbon may be taken off on conventional conveyor rolls without injuring the surface of the glass. It then passes through the usual annealing lehr.

In present commercial practice such glass, particularly when reheated for further processing, e.g. bending or tempering, and subsequently cooled, exhibits an iridescence, termed "bloom," on the surface of the glass that was in contact with the tin. The presence of bloom makes the glass unacceptable for some uses, and it is now standard practice to polish mechanically the lower surface of the glass ribbon as it emerges from the lehr. This requires a substantial additional expenditure for polishing facilities and increases manufacturing costs.

It is believed that the bloom is caused by migration or diffusion of tin into the surface layer of the glass and that this tin upon reheating of the glass for subsequent processing such as bending or tempering, causes a series of microscopic wrinkles in the surface of the glass. It has been demonstrated that the presence of tin oxides on the bath enhances the migration of tin into the glass. These wrinkles serve in the manner of a diffraction grating to break down white light into its component colors, producing an iridescence on the surface of the glass. The polishing step currently practiced removes enough of the surface layer into which tin has migrated to inhibit the appearance of bloom.

It is the usual practice to provide a protective atmosphere above the tin bath to reduce the oxidation of tin and the formation of other compounds. Such atmospheres are formed at least principally of nitrogen and may depend on the reducing power of a small amount of hydrogen. In the process of the present invention, the atmosphere includes a small amount of carbon monoxide. The oxidizing constituents of such atmospheres may include water vapor, carbon dioxide and oxygen. The reducing power of hydrogen and carbon monoxide is balanced against the oxidizing power of water vapor, carbon dioxide and oxygen. The proper balance between these two groups of gases to protect tin from oxidation at any given temperature is indicated in the drawing appearing upon page 349 of Physical Chemistry of Metals by Darken and Gurry, 1953. From this drawing, the exact composition of these gases in chemical equilibrium with tin and tin oxide at any given temperature may be ascertained.

It has been found that by use of a substantial amount of carbon in contact with both the tin bath and the protective atmosphere, the atmosphere may be maintained somewhat reducing despite the entrance of a small amount of oxygen and water vapor into the chamber so that the amount of tin oxide in the tin bath may be held to a minimum and the amount of tin picked up by the glass ribbon is so small that the undersurface of the glass will not display the customary bloom upon reheating in normal commercial processing. Thus the usual step of polishing the undersurface of the glass is no longer necessary. In ths specification the term carbon is understood to include graphite as well as the usual amorphous carbon.

It has been observed that beneficial results are to be obtained when the carbon is in contact with only the tin, or with only the protective atmosphere as well as in the preferred structure in which the carbon is in contact with both the tin and the protective atmosphere. The presence of this carbon neutralizes quickly the effect of any incursions of atmospheric oxygen from inevitable furnace leakage. Otherwise stated, the carbon is sacrificed to prevent the oxidation of tin and to re-establish the protective quality of the protective atmosphere.

The presence of carbon within the enclosed chamber and exposed to the action of the protective atmosphere requires a modification of the type of protective atmosphere which would be deduced from the considerations advanced for tin in the Darken and Gurry publication. This is particularly true since the cooler end of the enclosed chamber may well operate at a temperature of 1100° F. to 1200° F. and the hotter end will approximate 2000° F. In addition to the limitations imposed by the Darken and Gurry considerations, carbon dioxide and water vapor must be substantially absent to avoid rapid deterioration of the protective carbon. An atmosphere which has been successfully employed contained carbon monoxide 4%, hydrogen 4%, carbon dioxide traces only, water vapor traces only, balance nitrogen (including argon).

Among the objects of the present invention are to provide an improved process for the manufacture of glass by the float process; to provide such a process for manufacture of glass which will not exhibit bloom; and generally to improve processes for the manufacture of float glass.

Other objects and objects relating to details and economies of the process will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming a part of this specification in which:

FIGURE 1 is a somewhat diagrammatic longitudinal vertical section of a tin chamber for the manufacture of float glass, and the adjacent delivery end of the glass melting and refining furnace and the entrance end of the annealing lehr.

FIGURE 2 is a vertical transverse section taken generally along the line 2—2 of FIGURE 1.

FIGURE 3 is a fragmentary vertical section of an alternative construction in which slabs of carbon are exposed to the atmosphere of the chamber.

In the manufacture of flat glass by the so-called "float" process, a continuous ribbon of glass is floated on a body of molten metal, preferably consisting essentially of tin, the glass in at least one zone in its progress across the tin being sufficiently fluid to spread in a smooth layer of uniform thickness. By continually adding glass at the entrance end of the tin bath and removing the glass ribbon at the exit end, a continuous ribbon of glass may be produced. By reducing the temperature of the molten tin at the exit end of the bath, the glass ribbon may be taken off onto conventional conveyor rolls without marking the surface of the glass, whereby glass of excellent fire-polished surface finish and optical quality equaling that of plate glass may be obtained.

Referring now to the drawings, the glass for the process of the present invention may be of any of the well-known types of commercial flat glass, preferably a silica, soda, lime glass which is melted and refined in a conventional melting furnace 10. A constant level of glass is maintained within the furnace 10 and molten glass is delivered through a forehearth 11. A gate 13 controls rate of glass flow from the furnace 10.

The stream of glass issuing from the forehearth 11 enters into an enclosed chamber 14 which is adapted to hold a bath 14 consisting at least principally of molten tin. The chamber 12 preferably is provided with a steel outer shell 15 which is lined with a layer of refractory insulating firebrick 16.

The tin bath 14 is contained within a carbon liner 17 in the bottom of enclosed chamber 12, formed of a plurality of carbon blocks, the side walls 24 of which project above the level of the tin bath. The end walls 25 and 26 of the liner adjacent the entrance and exit of the chamber 12 also project above the level of the tin bath. The liner 17 provides an extended area of carbon within the furnace above the level of the tin bath in contact with the atmosphere within the chamber and an extended area in contact with the tin bath. The depth of tin maintained within the chamber need not be uniform throughout its length.

The temperature within the chamber 12 is controlled by a series of electric heaters 20 carried by the roof 21 of the chamber. Preferably, glass from the furnace 10 is introduced into the chamber 12 at a temperature of about 1850° F., at which the glass is quite fluid. As the glass ribbon 22 passes down the length of the chamber, it is progressively cooled to a temperature of about 1100° F. at the exit end of the chamber, the heaters serving primarily to control the rate of cooling of the ribbon and to provide a uniform temperature across the width of the ribbon. The temperature of the atmosphere adjacent to the heaters may, at times, be as high as about 2000° F. If desired, additional heaters can be supplied for use initially in melting the tin for the startup of the process, the chamber being maintained at temperature during operation primarily by the molten glass entering the chamber. Protective atmosphere is introduced through conduits 27.

The ribbon of glass 22 passes outwardly from the chamber 12 through an exit opening 29. The exit opening is sealed to retard the passage of atmosphere into the chamber alongside the ribbon and in addition, a positive pressure (above atmospheric) is maintained within the chamber to prevent, insofar as possible, entrance of outside atmosphere.

Immediately after exit from the chamber 12, the glass ribbon 22 enters an annealing lehr 30 where the ribbon is further cooled under controlled conditions to remove stresses and provide a glass that can easily be cut for further fabrication. The annealing lehr is generally conventional and comprises a series of driven, preferably asbestos-covered rolls 31 for supporting the ribbon and advancing it forwardly.

The outstanding characteristic of glass made by the above-described process and equipment is the lower tin content in the undersurface of the glass in contact with the tin when compared to glass produced in chambers in which there is no substantial amount of carbon in contact with the tin bath and atmosphere in the hotter zones of the tank (above about 1200° F.) or in which a highly reducing atmosphere is not provided by other means. It is believed that the lesser tin content of glass produced according to the present invention is due to reaction of the carbon at these higher temperatures with any oxygen present in the tin or in the atmosphere, thereby providing a tin bath which is maintained substantially free from oxides. The glass made according to this invention may be reheated for bending and tempering and then cooled without the appearance of bloom on the surface of the glass that was in contact with the tin bath. Accordingly, this invention obviates the necessity of a polishing step or other mechanical or chemical treatment of the undersurface of the ribbon after annealing to prevent the formation of bloom upon subsequent heating.

In addition, the carbon liners provide a shallow container for the tin to which the glass ribbon will show little tendency to adhere, even if the ribbon should pile up in the chamber.

If desired, additional carbon may be supplied for reaction with the atmosphere by securing slabs 32 of carbon to an inner wall of the chamber 12 above the level of the tin bath as indicated in FIGURE 3. This may be used in addition to the carbon liner 17 or in place of the carbon liner if it is desired to have the carbon in contact only with the atmosphere within the chamber. If the carbon is in contact only with the atmosphere, entrance of oxygen into the tin via the atmosphere will be eliminated or greatly reduced. Further, the area of carbon liner 17 in contact with the atmosphere may be reduced or eliminated, relying only on contact between the carbon and the tin.

We claim:

1. A process for manufacturing flat glass which is not susceptible to the formation of tin bloom upon reheating comprising forming a continuous ribbon of float glass on an uninterrupted bath of molten tin contained in a refractory float chamber, confining within said float chamber a protective atmosphere which atmosphere is non-reactive with both carbon and tin over the range of temperatures encountered in glass float chambers and which is actively reducing to tin oxide, said protective atmosphere containing at most not more than traces of oxygen, carbon dioxide or water vapor, said bath of molten tin being confined in a container the inner surface of which comprises carbon refractory, the extent of the carbon refractory being sufficient to react with any oxygen present in the molten tin bath and to thereby maintain a molten tin bath substantially free of tin oxides and continuously withdrawing a ribbon of glass from the refractory float chamber, said glass having a tin content sufficiently low to prevent the formation of tin bloom upon subsequent reheating.

2. A process for manufacturing flat glass which is not susceptible to the formation of tin bloom upon reheating comprising forming a continuous ribbon of float glass upon an uninterrupted bath of molten tin contained in a refractory float chamber, confining within said float chamber a protective atmosphere which atmosphere is non-reactive with both carbon and tin over the range of temperatures encountered in glass float chambers and which is actively reducing to tin oxide, said protective atmosphere containing at most not more than traces of oxygen, carbon dioxide and water vapor, said bath of molten tin being confined in a container the inner surface of which comprises carbon refractory which is in contact with both the protective atmosphere and the molten tin bath, the extent of the carbon refractory being sufficient to react with any oxygen present in the molten tin bath and being sufficient to react with and reduce any carbon dioxide or water vapor present in the protective atmosphere and to thereby maintain a molten tin bath substantially free of tin oxide and continuously withdrawing a ribbon of glass from the refractory float chamber, said glass having a tin content sufficiently low to prevent the formation of tin bloom upon subsequent reheating.

3. The process recited in claim 2 in which the protective atmosphere consists essentially of 4% carbon monoxide, 4% hydrogen, remainder nitrogen.

References Cited

UNITED STATES PATENTS

| 3,083,551 | 4/1963 | Pilkington | 65—32 |
| 3,264,081 | 8/1966 | Pilkington | 65—99 |

FOREIGN PATENTS

| 1,369,702 | 7/1964 | France. |

DONALL H. SYLVESTER, *Primary Examiner.*
R. L. LINDSAY, *Assistant Examiner.*